A. C. J. HENNIG.
PIPE COUPLING.
APPLICATION FILED AUG. 14, 1915.
1,211,941.
Patented Jan. 9, 1917.
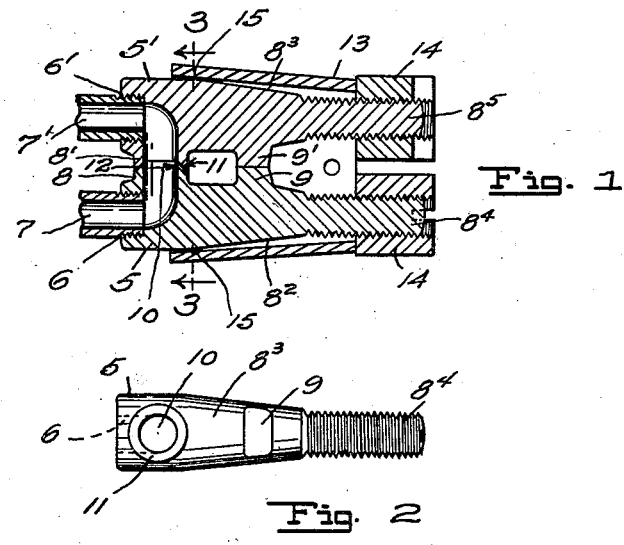
Fig. 1
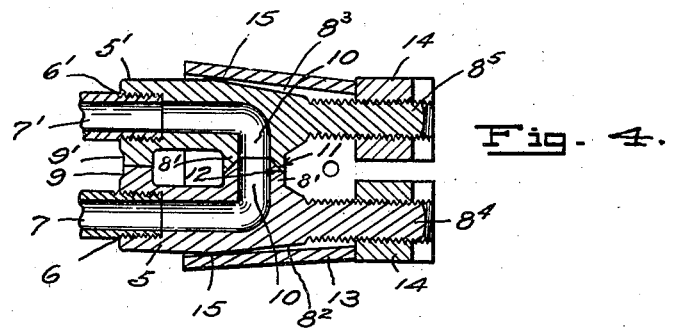
Fig. 2
Fig. 4
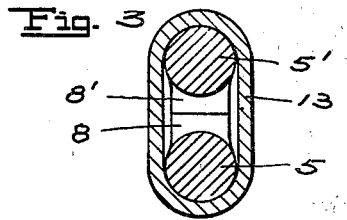
Fig. 3
WITNESS
F. C. Matheny
INVENTOR
ADOLPH C. J. HENNIG
BY
Pierre Barnes
ATTORNEY

UNITED STATES PATENT OFFICE.

ADOLPH C. J. HENNIG, OF SEATTLE, WASHINGTON.

PIPE-COUPLING.

1,211,941.  Specification of Letters Patent.  Patented Jan. 9, 1917.

Application filed August 14, 1915. Serial No. 45,594.

*To all whom it may concern:*

Be it known that I, ADOLPH C. J. HENNIG, a citizen of the United States, residing at Seattle, in the county of King and State of Washington, have invented certain new and useful Improvements in Pipe-Couplings, of which the following is a specification.

This invention relates to pipe couplings, and its object is to provide an improved device of this character which is adapted for connecting the ends of approximately parallel pipe so that the latter may be readily coupled or separated from each other.

The invention consists of two complementary elbow fittings of novel construction which are arranged to be secured to the ends of pipes, a sleeve member which is employed for clamping said fittings together, and nuts engaging threaded projections on the respective fittings for detachably securing said sleeve in its operative position.

The invention is illustrated in the accompanying drawings, in which—

Figure 1 is a longitudinal section showing the invention in its preferred form. Fig. 2 is a side elevational view of one of the elbow fittings such as shown in Fig. 1. Fig. 3 is a transverse sectional view through 3—3 of Fig. 1. Fig. 4 is a view similar to Fig. 1 of a modified form of construction.

The reference numerals 5 and $5^1$ designate elbow fittings having in their inner ends sockets 6 and $6^1$ which, as shown, are screw threaded to receive the threaded extremities of the pipes 7 and $7^1$ which are to be coupled. The fittings may, however, be otherwise joined to the respective pipes as, for example, by welding the same together. At the inner sides of said fittings they are provided with opposing protuberances 8—$8^1$ and 9—$9^1$ which are machined or formed so as to have those on one fitting juxtaposed with the corresponding ones of the other.

The two embodiments of my invention illustrated in Figs. 1 and 4 are similar except that the positions of the protuberances 8—$8^1$ and 9—$9^1$ are shown in reversed positions relative to corresponding ends of the respective elbow fittings. The protuberances 8—$8^1$ are formed tubular and the openings 10 therein communicate with the sockets 6—$6^1$ and constitute therewith the passage connecting the pipes when they are coupled. To make a non-leakable joint at their meeting ends the protuberance 8 is formed with a tapering end 11 which fits into a recess 12 provided in the end of the protuberance $8^1$. From near their socket ends said fittings are formed with tapering portions $8^2$ and $8^3$ and terminate in screw-threaded stud portions $8^4$ and $8^5$.

13 represents a sleeve of a substantially elliptical form in transverse section and is internally tapered, as shown, so that when placed upon a pair of the aforedescribed fittings and forced by nuts 14 toward the socket ends thereof, it will clamp the fittings in positions to maintain the tubular protuberances firmly together. The shapes of said fittings with relation to the sleeve are such that the former will be embraced by the sleeve, as at 15, in a plane intermediate the remote sides of the protuberances for the purpose of causing the protuberances to be firmly seated when held together by the sleeve. With the fittings 5 and $5^1$ secured to the pipes 7 and $7^1$ the latter are coupled by placing the fittings so as to have the protuberances thereof oppose each other, then inserting the tapered ends of the fittings within the sleeve 13 and finally screwing the nuts 14 against the sleeve to force the same longitudinally of the pipes to thereby rigidly couple the pipes. To disconnect the fittings from each other, the nuts are first retracted from the sleeve which may thereupon be withdrawn to free the fittings from each other.

The invention is of simple and durable construction and is useful in many applications such as in coupling coil elements of a water-tube boiler, or in those of refrigerating apparatus, etc. The coupling and uncoupling may be readily effected and when in operation affords a tight and rigid joint.

What I claim is:—

1. A pipe coupling comprising two elbow fittings adapted to be connected with the pipes at an end of each and having communicating side outlets, a sleeve for clamping said fittings together, and nuts engaging screw-threaded portions of the respective fittings for adjustably securing said sleeve upon the fittings.

2. A pipe coupling comprising two elbow fittings formed with passages extending from an end of each and communicating through complementary protuberances provided at the sides of said fittings, said fittings being also provided with protuberances adapted to be juxtaposed with each other when the aforesaid protuberances are joined, a sleeve arranged to engage over tapered portions of both of said fittings, and nuts engaging screw-threaded portions of the fittings for securing the sleeve in engagement with the fittings.

3. A pipe coupling comprising two elbow fittings each having a screw-thread at one end, a socket at its other end and a tapered portion intermediate said ends, said fitting being provided with pairs of laterally extending protuberances, one pair of said protuberances having a passage therein which communicates with the respective sockets and having their meeting ends formed to make a non-leakable joint, a sleeve arranged to fit over the tapered portions of both fittings to clamp said fittings together, and means for detachably securing said sleeve in operative position.

4. A pipe coupling comprising two members respectively adapted to be secured to the ends of pipes and having complementary passages extending from an end of each and terminating in a lateral opening at the side of the respective member, said members being formed to make a non-leakable joint about such side opening when the members are clamped together, a sleeve having a tapered opening extending therethrough to receive said members, and means engageable with said members for thrusting said sleeve longitudinally of the members to couple the latter together.

Signed at Seattle, Washington, this 24th day of July, 1915.

ADOLPH C. J. HENNIG.

Witnesses:
PIERRE BARNES,
THOS. F. MURPHINE.